United States Patent
Duan et al.

(10) Patent No.: US 7,665,184 B2
(45) Date of Patent: Feb. 23, 2010

(54) HINGE ASSEMBLY WITH ROLLING MEANS

(75) Inventors: Chao Duan, Shenzhen (CN); Chia-Hua Chen, Tu-Cheng (TW); Shun Guo, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 803 days.

(21) Appl. No.: 11/267,061

(22) Filed: Nov. 4, 2005

(65) Prior Publication Data

US 2006/0096063 A1    May 11, 2006

(30) Foreign Application Priority Data

Nov. 6, 2004    (CN)    ............... 2004 2 0095016 U

(51) Int. Cl.
  *E05D 11/10*    (2006.01)
(52) U.S. Cl. ............... 16/330; 16/273; 16/303
(58) Field of Classification Search .......... 16/330, 16/303, 275, 273, 276; 379/433.13, 433.12; 455/90.3, 90.1, 550.1, 575.1, 575.3; 361/679.06, 361/679.11, 679.12, 679.27, 679.28
See application file for complete search history.

(56) References Cited

U.S. PATENT DOCUMENTS

| | | | |
|---|---|---|---|
| 6,141,831 A * | 11/2000 | Novin et al. ............... 16/330 |
| 6,785,936 B2 * | 9/2004 | Koshikawa ............... 16/328 |
| 6,789,292 B2 * | 9/2004 | Oshima et al. ............... 16/297 |
| 6,832,411 B2 * | 12/2004 | Koshikawa et al. ............ 16/330 |
| 7,168,135 B2 * | 1/2007 | Jung et al. ............... 16/367 |
| 7,168,136 B2 * | 1/2007 | Gan ............... 16/367 |
| 7,251,859 B2 * | 8/2007 | Oshima et al. ............... 16/330 |
| 2002/0069482 A1 * | 6/2002 | Oshima et al. ............... 16/303 |
| 2003/0056325 A1 * | 3/2003 | Koshikawa et al. ............ 16/334 |
| 2003/0101538 A1 * | 6/2003 | Koshikawa ............... 16/277 |
| 2006/0174443 A1 * | 8/2006 | Takagi et al. ............... 16/330 |

FOREIGN PATENT DOCUMENTS

CN    02107873.4    7/2004

* cited by examiner

*Primary Examiner*—Chuck Y. Mah
(74) *Attorney, Agent, or Firm*—Steven M. Reiss

(57) ABSTRACT

A hinge assembly (10) includes a shaft (20), a follower (22), a cam (30), a washer (50), a rolling means, and an urging means. The shaft has a securing portion (21) formed at one end thereof. The follower connects with the shaft. The cam essentially is in the shape of a cylinder, and includes a cam surface (32) and defines a cam hole (31) extending therethrough. The cam hole receives the shaft therethrough. The washer defines a center hole (52), and is located around the shaft. The rolling means is disposed between the washer and the cam. One end of the urging means abuts the shaft, and an opposite end of the urging means biases the washer. The cam surface of the cam is rotatably and movably engaged with the follower under force of the urging means.

18 Claims, 6 Drawing Sheets

HINGE ASSEMBLY WITH ROLLING MEANS

FIELD OF THE INVENTION

The present invention relates to hinge assemblies, and particularly to a hinge assembly for foldable electronic devices such as mobile telephones, electronic notebooks, and so on.

GENERAL BACKGROUND

With the development of the technologies of wireless communication and information processing, portable electronic devices such as mobile telephones and electronic notebooks are now in widespread use. These electronic devices enable consumers to enjoy the convenience of high technology services anytime and anywhere. Foldable electronic devices are particularly favored by consumers for their convenience.

Generally, foldable electronic devices have most of the electronics in one housing, called the body. The other housing, called the cover, normally contains fewer electronic components than the body. Other foldable electronic devices have all the electronics in the body, with the cover containing no electronics. Various types of hinge assemblies are used to join a body and a cover of a foldable electronic device, so that the cover can unfold up from and fold down upon the body. Manufacturers are constantly seeking to reduce the volume, size and weight of portable foldable electronic devices. Thus, it is desirable that the hinge assembly coupling the main housing with the cover is modularized and miniaturized. A modularized hinge assembly has moving parts such as a cam member, a cam follower and a spring held together in a unified structure. The structure is easily and quickly attached to the main housing and the cover during mass production. A miniaturized hinge assembly has as few parts as possible, with the parts being as small as practicable.

One kind of foldable electronic device with a hinge assembly is described in P.R. China Patent No. 02107873.4 issued on Jul. 28, 2004. The foldable electronic device is a mobile phone. The hinge assembly includes a housing secured to a body of the mobile phone, a spring received in the housing, a rotary cam rod, and a shaft with a follower and a connecting portion. The rotary cam rod is received in the housing and engages with the housing. One end of the spring contacts an inner wall of the housing, and the other end of the spring resists one end of the rotary cam rod. The shaft passes through the rotary cam rod, the spring and a washer in that order.

Although the above-described hinge assembly is suitable for some foldable electronic devices, sliding friction is produced between the spring and the rotary cam rod because of relative rotation therebetween. This wastes energy and causes abrasion of the spring and the rotary cam rod. The abrasion may eventually lead to premature malfunction or failure of the hinge assembly.

What is needed, therefore, is a hinge assembly which can have a relatively long working lifetime and which is energy efficient and convenient to use.

SUMMARY

In a first preferred embodiment, a hinge assembly is provided for joining a flip cover to a main body of a foldable electronic device. The hinge assembly comprises a shaft, a follower, a cam, a washer, a rolling means, and an urging means. The shaft has a securing portion formed at one end thereof, for connecting to the main body of the foldable electronic device. Preferably, the follower is integrally connected with the shaft. The cam essentially is in the shape of a cylinder, and is for connecting to the flip cover of the foldable electronic device. The cam includes a cam surface, and defines a cam hole extending therethrough. The cam hole receives the shaft therethrough. The washer defines a center hole, and is located around the shaft. The rolling means is disposed between the washer and the cam. One end of the urging means abuts the shaft, and an opposite end of the urging means biases the washer. The cam surface of the cam is rotatably and movably engaged with the follower under the force of the urging means.

A main advantage of the above-described hinge assembly is that the cam and the urging means do not directly contact each other, which reduces friction associated with relative rotation between the cam and the urging means. Accordingly, when the hinge assembly is assembled in a mobile phone, the energy required in opening the flip cover of the mobile phone is reduced. Furthermore, the working lifetime of the hinge assembly is prolonged.

In a second preferred embodiment, a hinge assembly is provided for joining a cover to a main body of a foldable electronic device. The hinge assembly comprises a shaft, a follower, a cam, a washer, a rolling means, and an urging means. The shaft has a securing portion formed at one end thereof, and a latching portion formed at an opposite end thereof. The securing portion is for connecting to the flip cover of the foldable electronic device. Preferably, the follower is integrally connected with the shaft. The cam is essentially in the shape of a cylinder, and is for connecting to the main body of the foldable electronic device. The cam comprises a cam surface, and defines a cam hole extending therethrough. The cam hole receives the shaft therethrough. The washer defines a center hole and is located around the shaft. The rolling means is disposed between the washer and the latching portion of the shaft. A first end of the urging means abuts the cam, and an opposite second end of the urging means biases the washer via the rolling means. The cam surface of the cam is rotatably and movably engaged with the follower under the force of the urging means.

A main advantage of the above-described hinge assembly is that the latching portion of the shaft and the urging means do not directly contact each other, which reduces friction associated with relative rotation between the latching portion and the urging means. Accordingly, when the hinge assembly is assembled in a mobile phone, the energy required in opening the flip cover of the mobile phone is reduced. Furthermore, the working lifetime of the hinge assembly is prolonged.

Other advantages and novel features will become more apparent from the following detailed description when taken in conjunction with the accompanying drawings, in which:

DETAILED DESCRIPTION OF PREFERRED EMBODIMENTS

Figure 1:
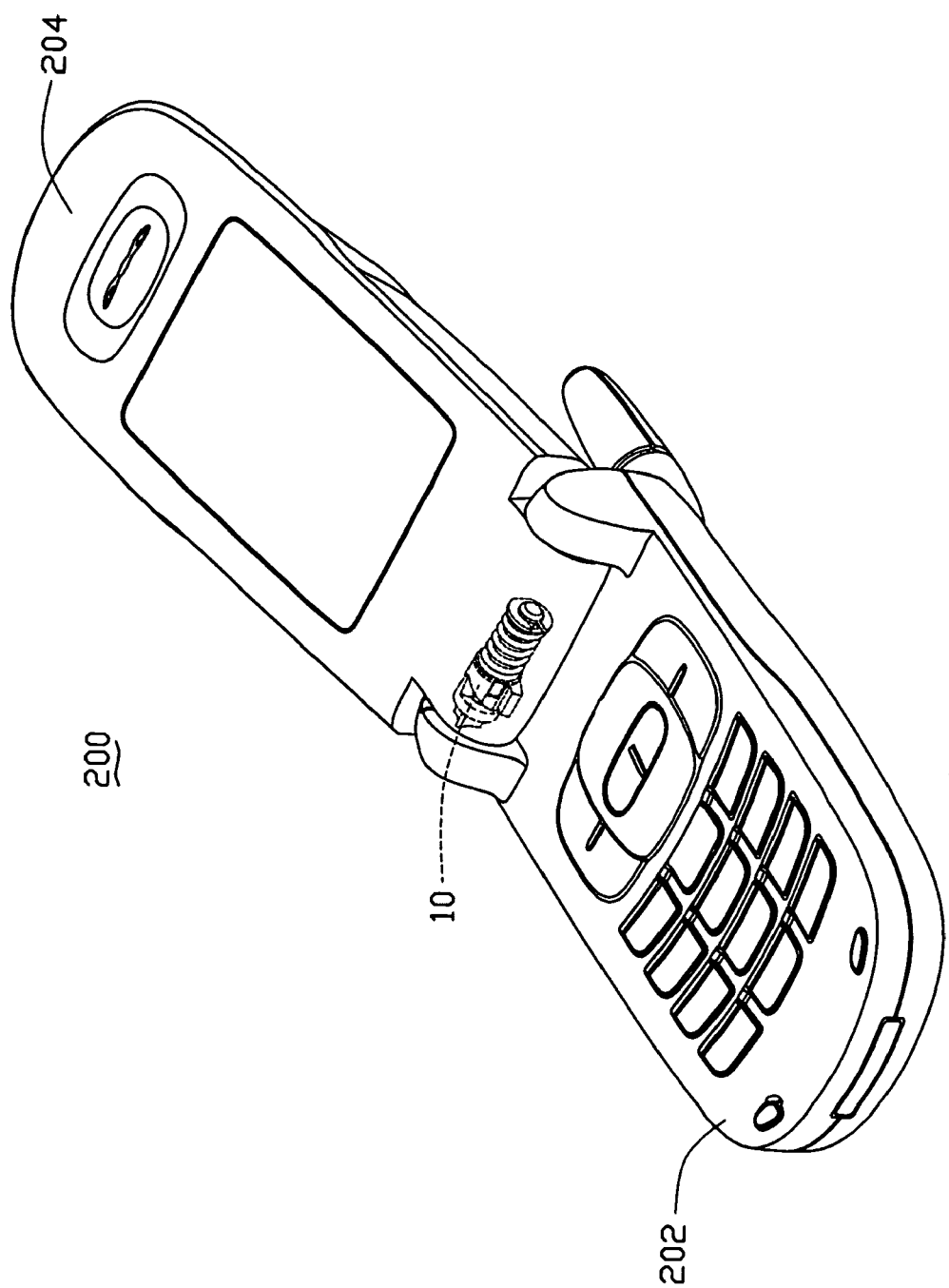
FIG. 1 is an isometric view of a flip type mobile phone including a flip cover, a main body, and a hinge assembly according to a first preferred embodiment of the present invention, the hinge assembly being shown with dashed lines.

Referring now to the drawings, FIG. 1 shows a flip type mobile phone 200, which includes a hinge assembly 10 according to a first preferred embodiment of the present invention. The mobile phone 200 has a main body 202 and a flip cover 204. The main body 202 and the flip cover 204 are pivotally connected to each other via the hinge assembly 10. It should be noted that the hinge assembly 10 may also be used to interconnect components like a main body and a flip cover of any of various different kinds of foldable electronic devices other than the mobile phone 200.

Figure 2:
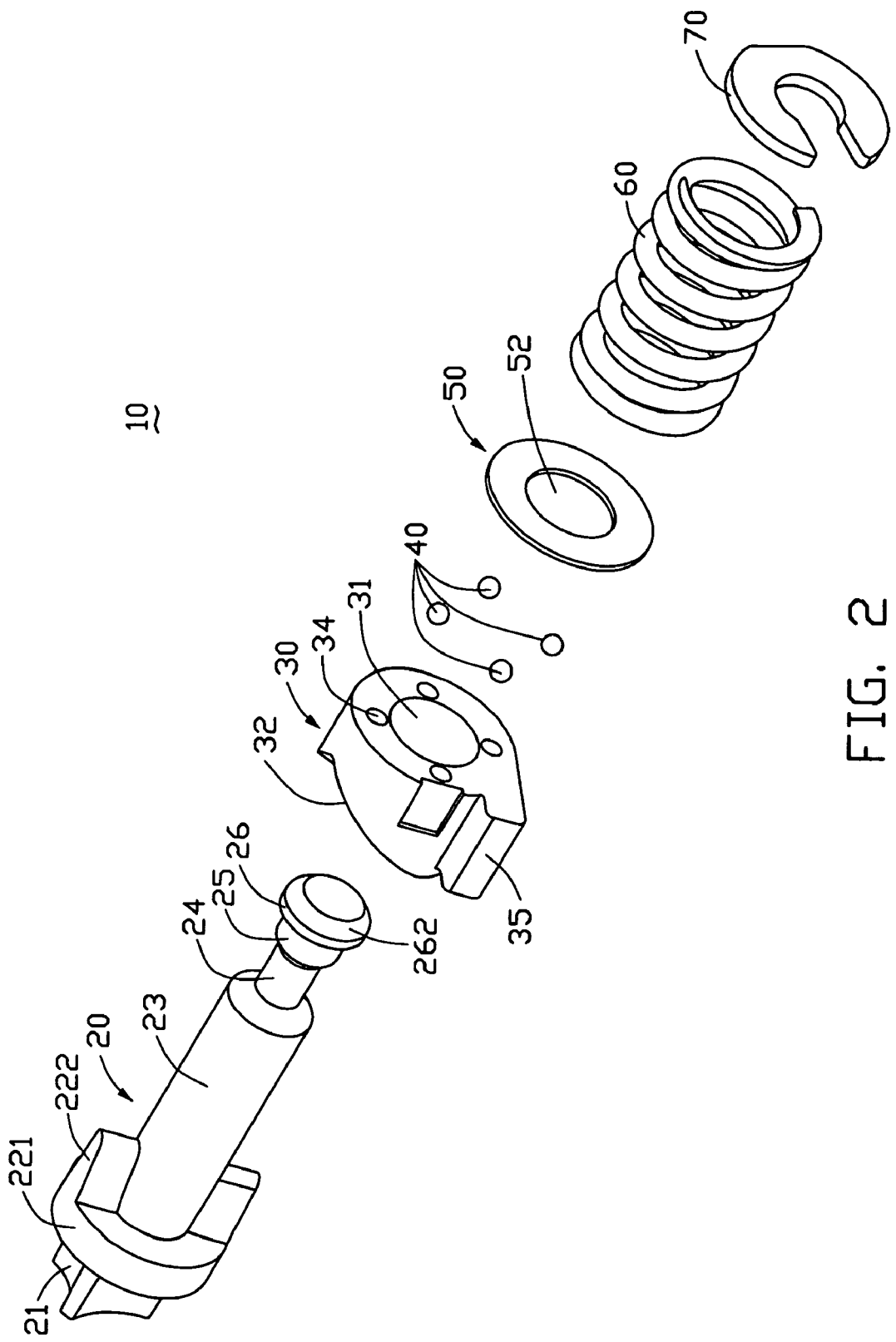
FIG. 2 is an enlarged, exploded, isometric view of the hinge assembly of FIG. 1.
Figure 3:
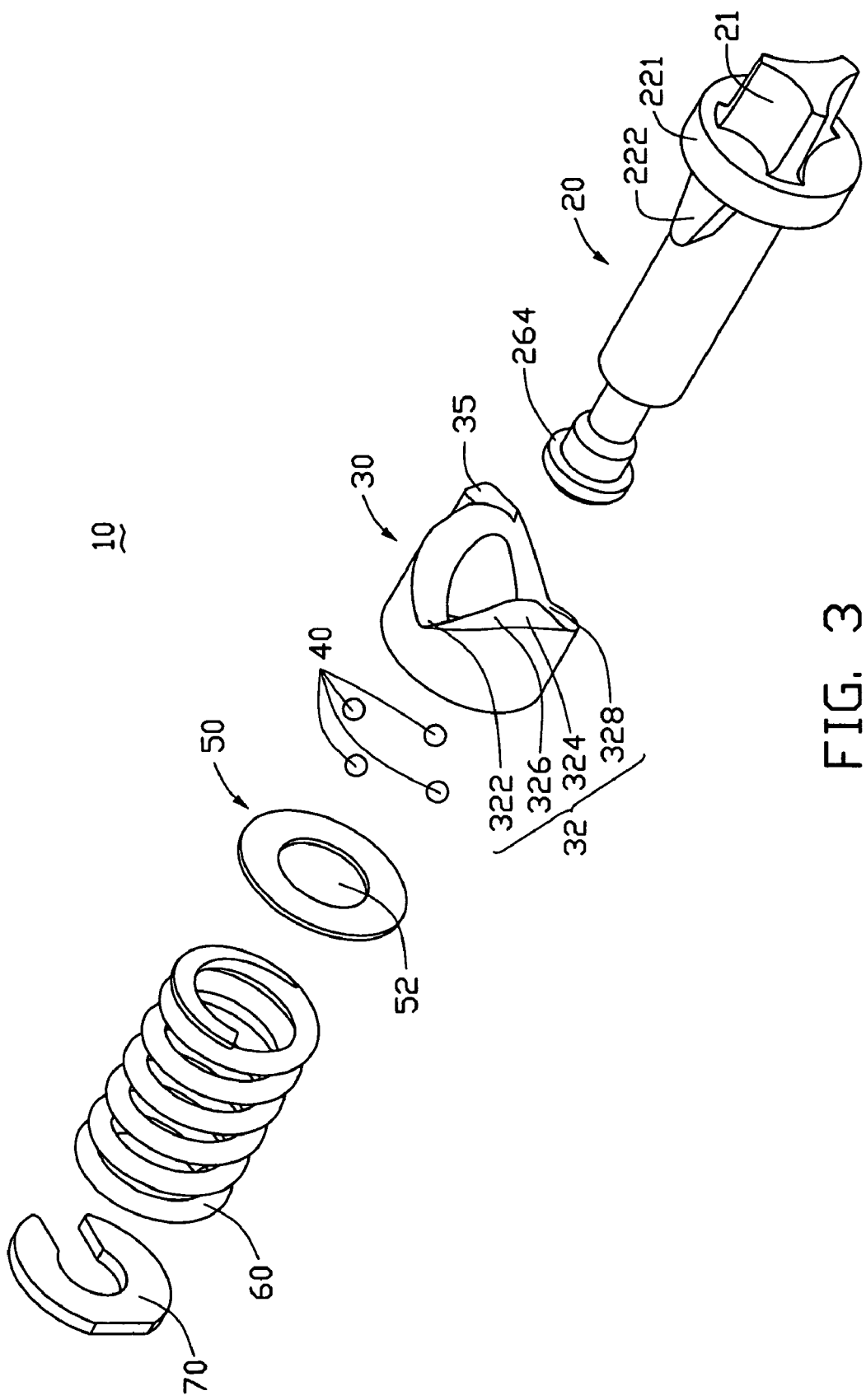
FIG. 3 is similar to FIG. 2, but viewed from another aspect.
Figure 4:
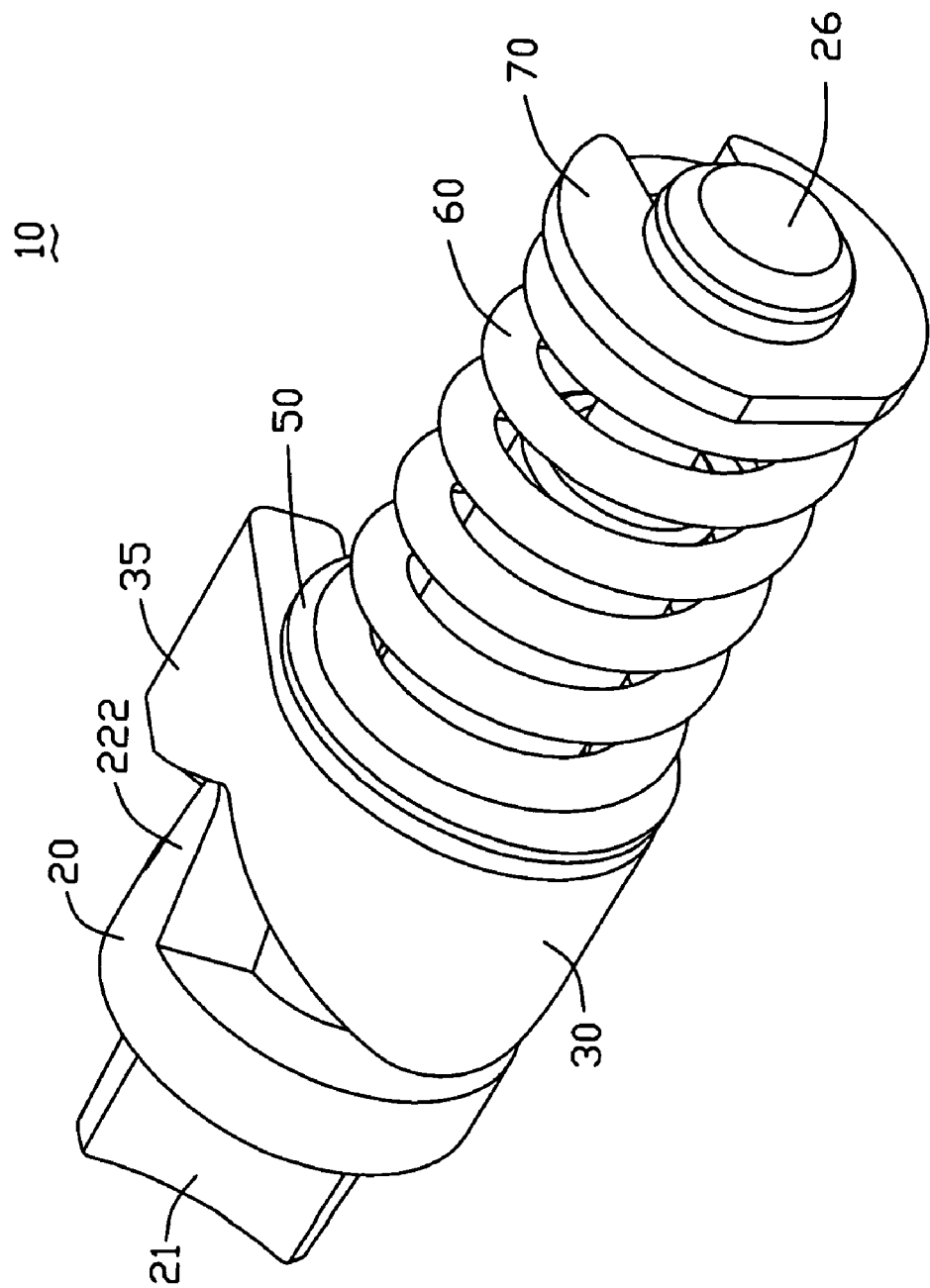
FIG. 4 is an enlarged, assembled view of the hinge assembly of FIG. 1.

Referring now to FIGS. 2-4, the hinge assembly 10 includes a shaft 20, a cam 30, a plurality of ball bearings 40 user as a buffer mechanism due to its rolling ability, a washer 50, a spring 60 functioning as an elastic urging means, and a C-clip 70. In the illustrated embodiment, there are four ball bearings 40. The shaft 20 extends through the cam 30, the washer 50, the spring 60 and the C-clip 70, thereby integrating the hinge assembly 10 into a complete unit.

The shaft 20 includes in sequence a securing portion 21 formed at one end thereof, a follower 22 (referring to FIG. 5) adjacent the securing portion 21, a large diameter portion 23, a neck portion 24, and a small diameter portion 25. The securing portion 21 is for engaging with the main body 202 of the mobile phone 200. The follower 22 includes an enlarged cylindrical portion 221, and two symmetrically opposite finger portions 222 extending in an axial direction and adjoining one end of the large diameter portion 23. The small diameter portion 25 has a latching portion 26 formed at one end thereof. A diameter of the latching portion 26 is larger than that of the small diameter portion 25. The latching portion 26 has a slant surface 262 for guiding, and defines an engaging step 264 where the latching portion 26 adjoins the small diameter portion 25.

The cam 30 is a generally cylindrical body and defines a central cam hole 31. The cam 30 has a cam surface 32 formed at one end thereof, and defines a plurality of hemispherical grooves 34 in an opposite end thereof. In the illustrated embodiment, there are four grooves 34. The grooves 34 are symmetrically spaced apart from each other around the cam hole 31. The grooves 34 can alternatively be partially hemispherical, arc-shaped relative to a central axis of the cam 30, substantially semicircular relative to the central axis of the cam 30, or have another suitable shape. Further, the grooves 34 can alternatively be a single substantially semicircular groove, a single substantially circular groove, or a single groove having another suitable shape. The cam surface 32 includes two valleys 322, two peaks 324, two moderate inclined planes 326, and two steep inclined planes 328. Preferably, the valleys 324 are located 180 degrees opposite from each other, and the peaks 322 are located 180 degrees opposite from each other. The cam 30 has a protrusion 35 formed on outer peripheral wall thereof, the protrusion 35 being oriented parallel to the central axis of the cam 30. The protrusion 35 is for engaging with the flip cover 204 of the mobile phone 200.

The washer 50 is circular and defines a center hole 52. A first main surface of the washer 50 resists the ball bearings 40, and an opposite second main surface of the washer 50 resists the spring 60.

The spring 60 is helical and preferably metallic, with an inner diameter larger than a diameter of the large diameter portion 23 of the shaft 20. Thus the spring 60 can be located around the shaft 20. A second end of the spring 60 resists the second main surface of the washer 50, and an opposite first end of the spring 60 resists the C-clip 70.

In assembly of the hinge assembly 10, firstly, the shaft 20 is passed through the cam hole 31 of the cam 30, the center hole 52 of the washer 50, and the spring 60 in that order. The ball bearings 40 are received between the washer 50 and the cam 30. The C-clip 70 is snappingly engaged around the small diameter portion 25 of the shaft 20, such that the spring 60 is slightly compressed. The ball bearings 40 movably engage in the grooves 34 of the cam 30, and abut against the first main surface of the washer 50 under the force of the spring 60. The second main surface of the washer 50 resists the second end of the spring 60. The first end of the spring 60 resists the C-clip 70. The engaging step 264 of the latching portion 26 of the shaft 20 resists the C-clip 70, and prevents the C-clip 70 from falling off from the end of the shaft 20. The cam surface 32 of the cam 30 always contacts the finger portions 222 no matter what rotational position the cam 30 is in, because of the urging force of the spring 60. The hinge assembly 10 is thus completely assembled, as shown in FIG. 4.

Referring to FIG. 4, in use, the protrusion 35 is engaged in a cavity (not shown) of the flip cover 204 of the mobile phone 200, and the securing portion 21 of the shaft 20 is engaged in the main body 202 of the mobile phone 200. When the flip cover 204 of the mobile phone 200 is in a fully closed position or a fully open position, the finger portions 222 of the shaft 20 are located in the valleys 322 of the cam 30 and engage with the valleys 322.

Figure 5:
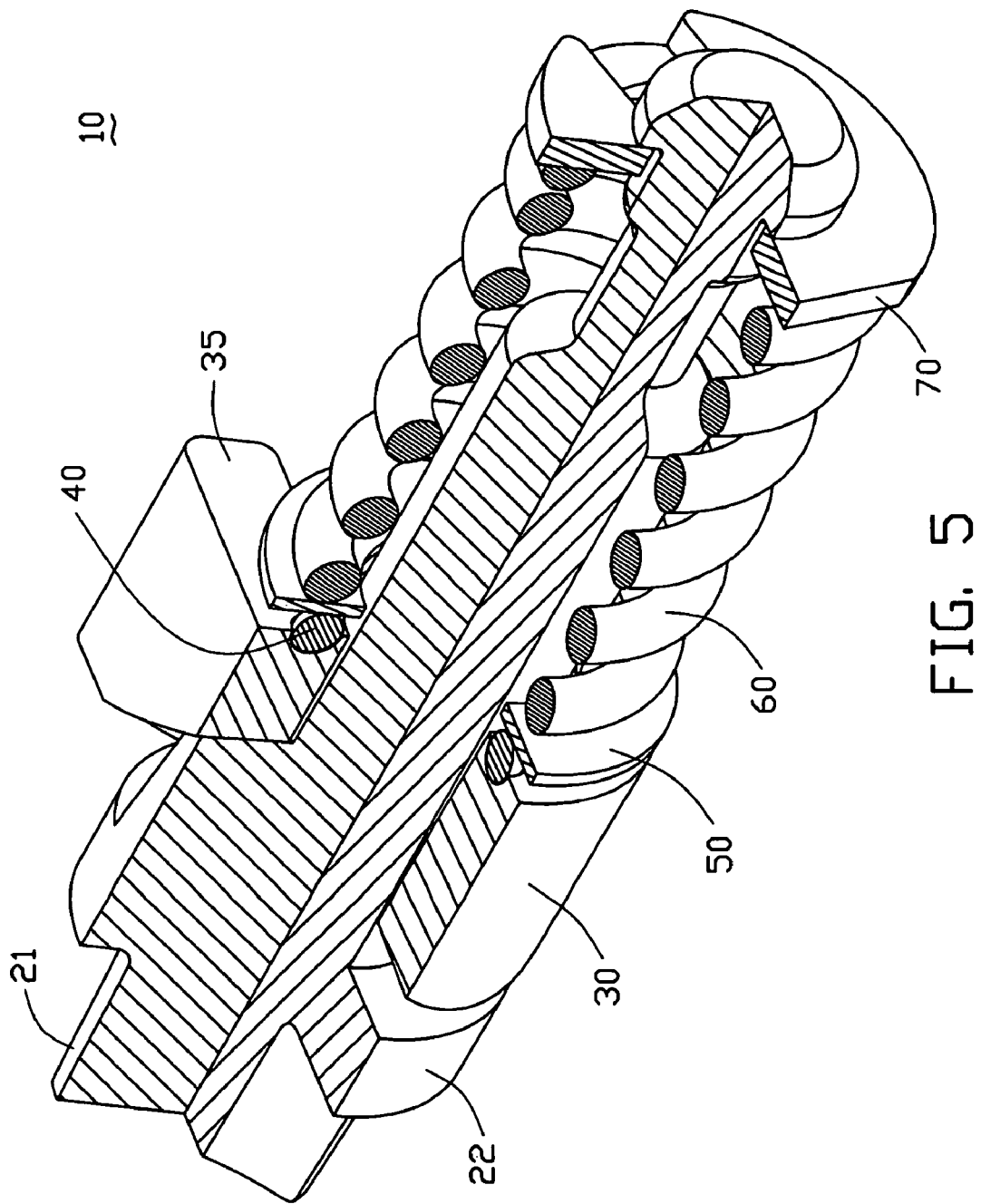
FIG. 5 is a cut-away view of FIG. 4.

Referring also to FIG. 5, when the flip cover 204 of the mobile phone 200 is rotated between an open position and a closed position (or vice versa), the cam 30 rotates along with the flip cover 204, while the shaft 20 remains fixed in the main body 202 of the mobile phone 200. As a result, the finger portions 222 ride along the moderate inclined planes 326 of the cam surface 32 from the valleys 322 to the peaks 324 (see FIG. 4), with the cam 30 moving toward the C-clip 70 and compressing the spring 60. At the same time, the cam 30 rotates relative to the washer 50. Because the cam 30 and the washer 50 resist each other via the ball bearings 40, only rolling friction is produced between the cam 30 and the washer 50. Once the finger portions 222 pass over the peaks 324, the spring 60 decompresses and drives the cam 30 back toward the cylindrical portion 221, with the finger portions 222 riding along the steep inclined planes 328 from the peaks 324 to the valleys 322. The flip cover 204 is thus rotated automatically to the fully closed position (or fully open position) under the decompression force of the spring 60. Accordingly, the flip cover 204 is moved 180 degrees relative to the main body 202, with the finger portions 222 once again mating in the valleys 322. In this way, the flip cover 202 is closed (or opened). Preferably, the structures of the flip cover 204 and the main body 202 are adapted to control the degree of rotation of the hinge assembly 10, such that the finger portions 222 can be held in one or more particular locations between the valleys 322 and the peaks 324.

A main advantage of the hinge assembly 10 is that the cam 30 and the spring 60 do not directly contact each other, thereby reducing friction associated with relative rotation between the cam 30 and the spring 60. Accordingly, when the hinge assembly 10 is assembled in the mobile phone 200, the energy required in opening the flip cover 202 of the mobile phone 200 is reduced. Furthermore, wear of the cam 30 and the spring 60 is reduced, and the working lifetime of the hinge assembly 10 is prolonged.

In further alternative embodiments, the follower 22 can be a separate element that is not integrally formed with the shaft 20. In such case, the follower 22 defines a shaft hole, and has a cam surface or finger portions. The ball bearings 40 can be replaced by another kind of rolling means such as roller bearings. The spring 60 can be made of nonmetallic material such as plastic. Further, the spring 60 can instead be another kind of elastic element or urging means known in the art, such as a resilient cylinder. The washer 50 can define a plurality of hemispherical grooves instead of or in addition to having the grooves 34. The C-clip 70 can be omitted, in which case the spring 60 directly resists the latching portion 26. There can be more than one protrusion 35.

Figure 6:
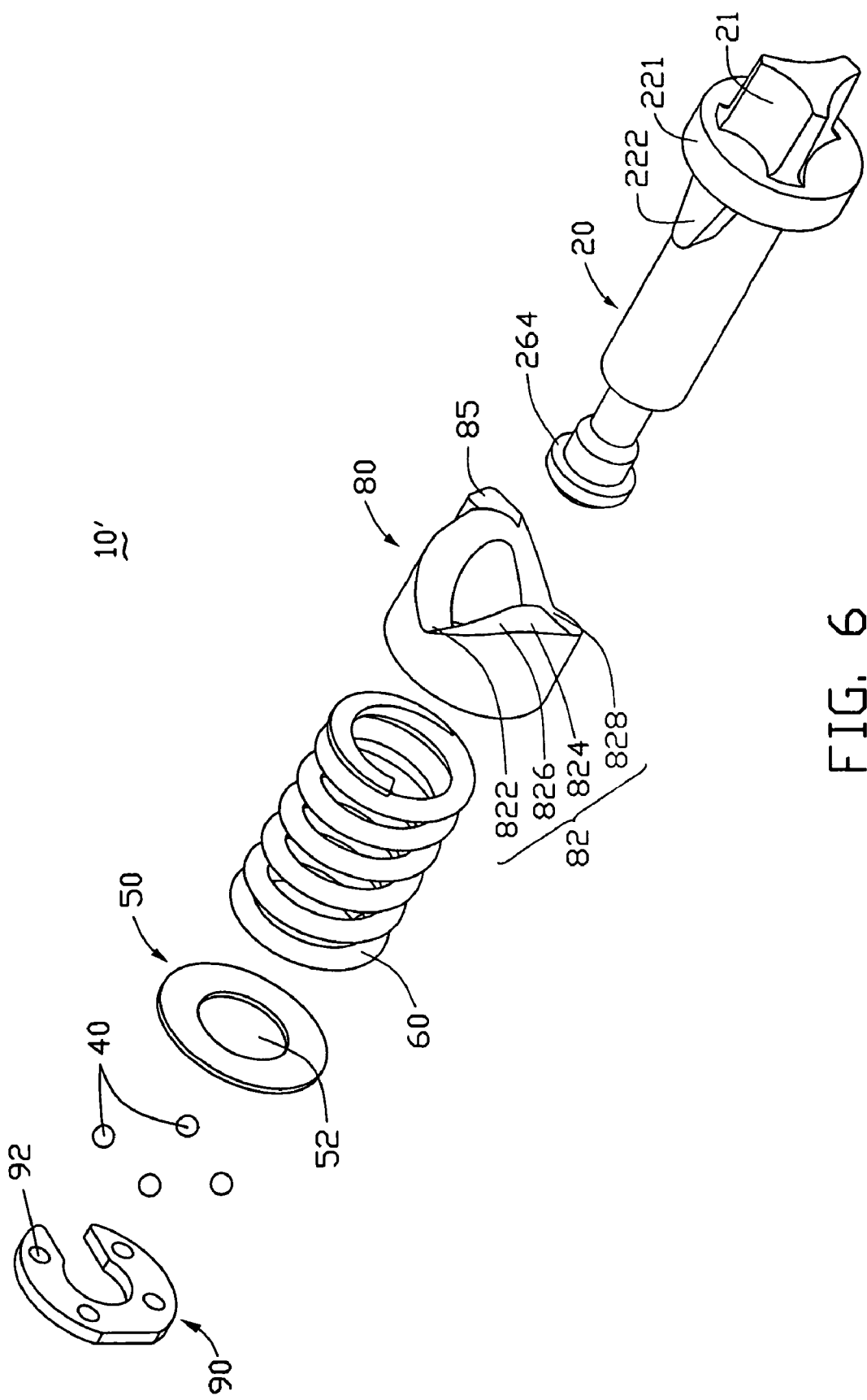
FIG. 6 is an exploded, isometric view of a hinge assembly according to a second preferred embodiment of the present invention.

Referring to FIG. 6, a hinge assembly 10' according to a second preferred embodiment of the present invention is similar to the hinge assembly 10, except that the hinge assembly 10' has a cam 80 and a C-clip 90. The cam 80 has a cam surface 82 formed at one end thereof. The cam surface 82 includes two valleys 822, two peaks 824, two moderate inclined planes 826, and two steep inclined planes 828. One surface of the C-clip 90 opposite to the spring 60 defines a plurality of hemispherical grooves 92. In the illustrated embodiment, there are four grooves 92. The hinge assembly 10' can be used to pivotally connect the main body 202 and the flip cover 204 of the mobile phone 200. However, the securing portion 21 of the shaft 20 is used to connect with the flip cover 204, and a protrusion 85 of the cam 80 is used to connect with the main body 202. In such case, there is no relative rotation between the cam 80 and the spring 60, whereas there is relative rotation between the C-clip 90 of the shaft 20 and the spring 60. Accordingly, the washer 50 and the ball bearings 40 are disposed between the spring 60 and the C-clip 90. Because the C-clip 90 and the spring 60 resist each other via the ball bearings 40, only rolling friction is produced between C-clip 90 and the spring 60. In an alternative embodiment, the C-clip 90 can be omitted. In such case, the washer 50 and the ball bearings 40 are disposed between the spring 60 and the latching portion 26 of the shaft 20. The hinge assembly 10' may have other alternative embodiments, similar to the alternative embodiments described above in relation to the hinge assembly 10.

A main advantage of the hinge assembly 10' is that the C-clip 90 of the shaft 20 and the spring 60 do not directly contact each other, thereby reducing friction associated with relative rotation between the C-clip 90 and spring 60. Accordingly, when the hinge assembly 10' is assembled in the mobile phone 200, the energy required in opening the flip cover 204 of the mobile phone 200 is reduced. Furthermore, wear of the spring 60 and the C-clip 90 is reduced, and the working lifetime of the hinge assembly 10' is prolonged.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A hinge assembly for joining a flip cover to a main body of a foldable electronic device, comprising:
    a shaft comprising a securing portion formed at one end thereof;
    a follower connecting with the shaft;
    a substantially cylindrical cam defining a cam hole extending therethrough, the cam hole receiving the shaft therethrough;
    a washer mounted with the shaft;
    a rolling means disposed between the washer and the cam and movably touching one of the washer and the cam; and
    an urging means, wherein the urging means is retained in such a manner that the cam is rotatably and slidably engaged with the follower under force of the urging means and the washer is non-slidable relative to the cam along the shaft under force of the urging means.

2. The hinge assembly as claimed in claim 1, wherein the rolling means is a plurality of ball bearings movably engaged between the cam and the washer.

3. The hinge assembly as claimed in claim 2, wherein at least one of a surface portion of the cam facing the washer and a surface portion of the washer facing the cam defines one or more grooves movably receiving portions of the ball bearings therein.

4. The hinge assembly as claimed in claim 3, wherein the grooves have configurations selected from the group consisting of hemispherical, partially hemispherical, arc-shaped, and substantially semicircular.

5. The binge assembly as claimed in claim 3. wherein the grooves are a single groove that is substantially semicircular or substantially circular.

6. The hinge assembly as claimed in claim 4, wherein the follower and the shaft are integrally formed, the follower is adjacent the securing portion and comprises two finger portions, and the cam is rotatably and movably engaged with the finger portions.

7. The hinge assembly as claimed in claim 6, wherein the shaft further comprises a C-clip secured thereto, a first end of the urging means abutting the C-clip, and an opposite second end of the urging means abutting the washer.

8. The hinge assembly as claimed in claim 1, wherein the urging means is a helical spring located around the shaft.

9. The hinge assembly as claimed in claim 1, wherein the cam has a cam surface having a pair of opposite valleys and a pair of opposite peaks.

10. The hinge assembly as claimed in claim 1. wherein the shaft further comprises a latching portion formed at an opposite end thereof, a first end of the urging means abutting the latching portion.

11. A hinge assembly for joining a cover to a main body of a foldable electronic device, comprising:
    a shaft having a securing portion formed at one end thereof, and a latching portion formed at an opposite end thereof;
    a follower connecting with the shaft;
    a substantially cylindrical cam defining a cam hole extending therethrough, the cam hole receiving the shaft therethrough;
    a washer mounted with the shaft;
    a rolling means disposed between the washer and the latching portion of the shaft and movably touching one of the washer and the latching portion; and
    an urging means, wherein the urging means is retained in such a manner that the cam being is rotatably and movably engaged with the follower under force of the urging means and the washer is non-slidable relative to the latching portion along the shaft under force of the urging means.

12. The hinge assembly as claimed in claim 11, wherein the rolling means is a plurality of ball bearings movably engaged between the washer arid the latching portion.

13. The hinge assembly as claimed in claim 12, wherein at least one of a surface portion of the washer facing the latching portion and a surface portion of the latching portion facing the washer defines one or more grooves movably receiving portions of the ball bearings therein.

14. The hinge assembly as claimed in claim 13, wherein the grooves have configurations selected from the group consisting of hemispherical, partially hemispherical, arc-shaped, and substantially semicircular.

15. The hinge assembly as claimed in claim 13, wherein the grooves are a single groove that is substantially semicircular or substantially circular.

16. The hinge assembly as claimed in claim 14, wherein the follower and the shaft are integrally formed, the follower is adjacent the securing portion and comprises two finger portions, and the cam is rotatably and movably engaged with the finger portions.

17. The hinge assembly as claimed in claim 11, wherein the urging means is a helical spring located around the shaft.

18. The hinge assembly as claimed in claim 11. wherein the latching portion comprises a clip portion, and the rolling means is disposed between the washer and the clip portion.

* * * * *

UNITED STATES PATENT AND TRADEMARK OFFICE
CERTIFICATE OF CORRECTION

PATENT NO. : 7,665,184 B2
APPLICATION NO. : 11/267061
DATED : February 23, 2010
INVENTOR(S) : Duan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1146 days.

Signed and Sealed this

Seventh Day of December, 2010

David J. Kappos
*Director of the United States Patent and Trademark Office*